United States Patent
Ke

(10) Patent No.: US 10,713,536 B1
(45) Date of Patent: Jul. 14, 2020

(54) CAMERA METHOD WITH ANIMAL RECOGNITION FUNCTION AND MONITORING CAMERA

(71) Applicant: Guangdong Outdoor Technology Limited., Dongguan (CN)

(72) Inventor: Xiumei Ke, Dongguan (CN)

(73) Assignee: GUANGDONG OUTDOOR TECHNOLOGY LIMITED, Dongguan, Guangdong (CN)

( * ) Notice: Subject to any disclaimer, the term of this patent is extended or adjusted under 35 U.S.C. 154(b) by 0 days.

(21) Appl. No.: 16/454,479

(22) Filed: Jun. 27, 2019

(51) Int. Cl.
*G06N 3/08* (2006.01)
*G06K 9/62* (2006.01)
*G08B 13/196* (2006.01)
*A01M 31/00* (2006.01)
*H04N 5/235* (2006.01)

(52) U.S. Cl.
CPC ......... *G06K 9/6267* (2013.01); *A01M 31/002* (2013.01); *G06K 9/6228* (2013.01); *G06K 9/6256* (2013.01); *G06N 3/08* (2013.01); *G08B 13/19663* (2013.01); *G08B 13/19669* (2013.01); *G08B 13/19695* (2013.01); *H04N 5/2354* (2013.01)

(58) Field of Classification Search
CPC ...... G06N 3/08; G06K 9/6228; G06K 9/6256; G06K 9/6267; A01M 31/002; G08B 13/19663; G08B 13/19669; G08B 13/19695
See application file for complete search history.

(56) References Cited

U.S. PATENT DOCUMENTS 9,871,959 B1 *  1/2018  Hlatky ............... H04N 5/23206

* cited by examiner

*Primary Examiner* — Thai Q Tran
*Assistant Examiner* — Jose M Mesa
(74) *Attorney, Agent, or Firm* — Shimokaji IP

(57) ABSTRACT

A camera method and a monitoring camera with an animal recognition function are provided. The camera method includes two steps of image capture and feature identification. Specifically, a camera system is started when a trigger signal representing that a moving object enters a camera range is captured by a trigger sensor of a monitoring camera, and the monitoring camera captures an image of an animal within the camera range. Then the captured image is transmitted to a feature identification system configured on the monitoring camera to determine an animal category of the animal presented in the captured image by the feature identification system, thereby classifying and storing the captured image. The camera method and the monitoring camera store the captured images separately from other images as needed, thereby effectively improving efficiency of browsing and analyzing the images of the monitored animal, which brings convenience to the user.

2 Claims, 1 Drawing Sheet

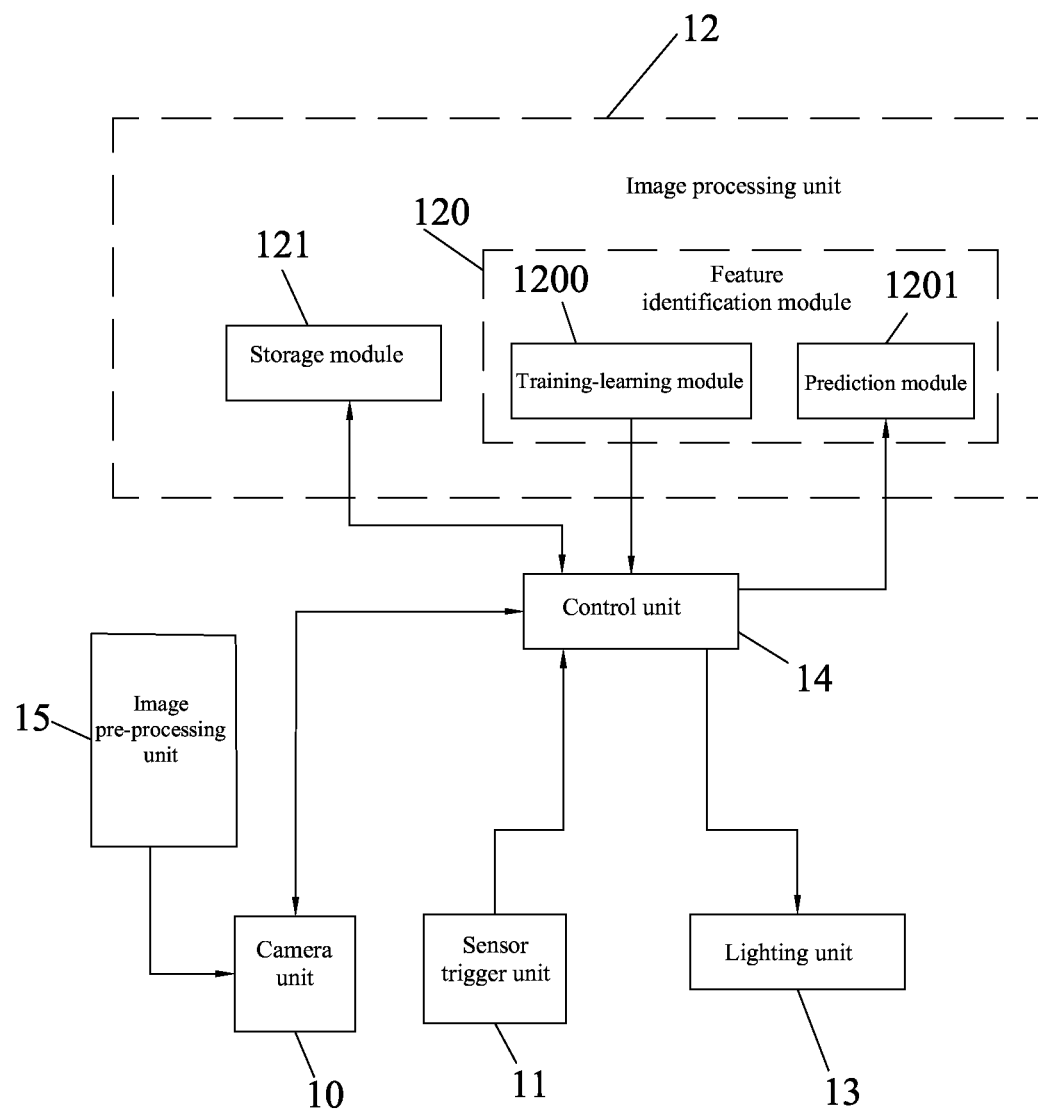

CAMERA METHOD WITH ANIMAL RECOGNITION FUNCTION AND MONITORING CAMERA

FIELD OF THE INVENTION

The invention relates to field of outdoor camera and monitoring device, and more particularly to a camera method with an animal recognition function and a monitoring camera with an animal recognition function.

BACKGROUND OF THE INVENTION

Compared with traditional cameras, monitoring cameras are mainly used for monitoring an object of interest in a scene. When the object of interest enters the scene, the monitoring camera sense and capture information, at this time the monitoring camera will take an image. Then the captured image is stored. Currently, monitoring cameras are widely used in the animal protection and outdoor hunting industry. Currently, the monitoring camera has two main operation modes. Firstly, the captured images are stored locally, and a user picks up the memory card. Or, the captured images are transmitted to a server over a wireless network, and the server analyzes the images to notify the user. Then, in the first operation mode, since the memory card stores thousands of images after a period of time, the user has to browse each image, which consumes time. For the second operation mode, the cost is relatively high, and it is not suitable for ordinary consumer.

SUMMARY OF THE INVENTION

One objective of the present invention is to provide a camera method and a monitoring camera with an animal recognition function capable of intelligently classifying the captured images.

To achieve above-mentioned objective, the present invention provides a camera method of a monitoring camera with an animal recognition function, including steps of:

image capture, starting a camera system when a trigger signal representing that a moving object enters a camera range is captured by a trigger sensor of a monitoring camera, and capturing an image of an animal within the camera range of the monitoring camera; and feature identification: transmitting the captured image to a feature identification system configured on the monitoring camera, and determining an animal category of the animal presented in the captured image by the feature identification system, thereby classifying and storing the captured image.

In comparison with the prior art, since the camera method with an animal recognition function includes the steps of image capture and feature identification. Specifically, the monitoring camera captures an image of an animal within a camera range of the monitoring camera, when a trigger signal is captured by a trigger sensor to start a camera system. Then the feature identification system determines an animal category in the captured image, thereby classifying and storing the captured image. Therefore, by means of the camera method of the present invention, the image of the animal to be monitored can be stored separately from other images, thereby effectively improving efficiency of browsing and analyzing the images. In addition, since the feature identification system is configured on the monitoring camera, compared with large and complex structure of the remote server, the structure of the monitoring camera is simple and the cost is low, which meets needs of users.

Preferably, said feature identification further includes steps of:

training and learning: inputting original image data with a label and a target box of the animal to be monitored into a deep convolutional neural network model to train and learn the original image data, thereby obtaining a trained model capable of detecting the animal to be monitored; and feature extraction and prediction: feeding the captured image to the deep convolutional neural network model to extract features, predicting an image category by the trained model, and classifying and storing the captured image according to the image category.

A monitoring camera with an animal recognition function is also provided, which includes a camera body provided with a camera unit, a sensor trigger unit and an image processing unit respectively electrically connected to the camera unit. Specifically, the sensor trigger unit is arranged for detecting a trigger signal within a camera range of the camera unit, and the camera unit is disposed for capturing an image according to the trigger signal. Furthermore, the image processing unit includes a feature identification module and a storage module. The feature identification module is configured to extract features of the animal in a captured image and determining an image category, thereby classifying and storing the captured image in the storage module.

Preferably, the feature identification module includes a training-learning module and a prediction module of a deep convolutional neural network model. Specifically, the training-learning module is configured to obtain a trained model capable of predicting the image category by learning original image data with a label and a target box of the animal to be monitored, and the prediction module is configured to extract features and predict the image category of the image captured by the camera unit.

Preferably, the sensor trigger unit includes a pyroelectric infrared sensor.

Preferably, the monitoring camera further includes a control unit which is electrically connected with the camera unit, the sensor trigger unit, and the image processing unit.

Preferably, the monitoring camera further includes an image pre-processing unit electrically connected to the camera unit, and the image pre-processing unit is arranged for denoising and pre-processing the captured image.

Preferably, the monitoring camera further includes a lighting unit electrically connected to the control unit, and the lighting unit is arranged for providing a brightness compensation for the camera unit at camera capturing moment.

A monitoring camera with an animal recognition function includes a processor, a memory, and a program. Specifically, the program is stored in the memory and executed by the processor, the program includes instructions for performing the above-mentioned camera method.

A readable storage medium includes a computer program cooperating with the monitoring camera, and the computer program is executed by a processor to perform the above-mentioned camera method.

BRIEF DESCRIPTION OF THE DRAWINGS

The accompanying drawings facilitate an understanding of the various embodiments of this invention. In such drawings:

FIG. 1 is a schematic illustration of a monitoring camera according to one embodiment of the present invention.

DETAILED DESCRIPTION OF ILLUSTRATED EMBODIMENTS

A distinct and full description of the technical solution of the present invention will follow by combining with the accompanying drawings.

A camera method of a monitoring camera with an animal recognition function is provided, including two steps of image capture and feature identification. Firstly, a camera system is started when a trigger signal representing that a moving object enters a camera range is captured by a trigger sensor of a monitoring camera, and the monitoring camera captures an image of an animal within the camera range of the monitoring camera. Then the captured image is transmitted to a feature identification system configured on the monitoring camera, and the feature identification system determines an animal category of the animal presented in the captured image by the feature identification system, thereby classifying and storing the captured image.

In this embodiment, said feature identification further includes steps of training and learning; and feature extraction and prediction. Specifically, training and learning includes inputting original image data with a label and a target box of the animal to be monitored into a deep convolutional neural network model to train and learn the original image data, thereby obtaining a trained model capable of detecting the animal to be monitored. Furthermore, feature extraction and prediction includes feeding the captured image to the deep convolutional neural network model to extract features, predicting an image category by the trained model, and classifying and storing the captured image according to the image category.

In order to perform above-mentioned monitoring method, as shown in FIG. 1, a monitoring camera with an animal recognition function is also provided, which includes a camera body provided with a camera unit 10, a sensor trigger unit 11 and an image processing unit 12 respectively electrically connected to the camera unit 10. Specifically, the sensor trigger unit 11 is arranged for detecting a trigger signal within a camera range of the camera unit 10, and the camera unit 10 is disposed for capturing an image according to the trigger signal. Furthermore, the image processing unit 12 includes a feature identification module 120 and a storage module 121. The feature identification module 120 extracts features of the animal in the captured image and determining an image category, thereby classifying and storing the captured image in the storage module 121.

More specifically, the monitoring camera works as follows. The monitoring camera is placed in an environment, such as a place where deer often appear, which monitors appearing frequency and number of deer. When the sensor trigger unit 11 detects that an animal enters the camera range of the monitoring camera, the camera unit 10 starts to capture an image of the animal that enters the camera range of the camera unit 10. After that, the captured image is transmitted to the image processing unit 12 for processing. Preferably, a trained model is preset in the image processing unit 12 for detecting the deer, and the feature identification module 120 extracts feature data in the captured image by using a deep convolutional neural network and sends the feature data to the trained model for predicting. Based on prediction results, whether the animal in the captured image is a deer is determined, if yes, the captured image is stored in a specified folder in the storage module 121; if not, the captured image is stored other folder in the storage module 121. Therefore, when the user need view the monitoring result of the monitoring camera, the user only need to open the specified folder for storing the deer, which saves a lot of browsing and analysis time. For the sensor trigger unit 11 in this embodiment, a pyroelectric infrared sensor is applied to trigger the camera unit 10 to take an image by detecting infrared rays emitted from the animal. Of course, other types of sensors can be elected according to the object to be monitored.

In addition, the trained model preset in the image processing unit 12 can predict various animal categories such as deer, goats, foxes and the like. A specified folder corresponding to each animal is respectively disposed in the storage module 121. After the image processing unit 12 receives the captured image, the feature identification module 120 extracts the feature date in the captured image through the deep convolutional neural network and sends the feature date to the trained model for predicting the image category, so that different animal images can be stored in different folders.

Furthermore, the feature identification module 120 includes a training-learning module 1200 and a prediction module 1201 basing on a deep convolutional neural network model. Specifically, the training-learning module 1200 is configured to obtain a trained model capable of predicting the image category by learning original image data with a label and a target box of the animal to be monitored. The prediction module 1201 is configured to extract image features and send the image features to the trained model for predicting the image category of the captured image. Specifically, the training-learning module 1200 is an intelligent training-learning system of a deep convolutional neural network model, which is applied to control the monitoring camera to learn various features of animals to be monitored as needed, thereby obtaining a desired trained model, which brings flexibility and convenience to the user. Preferably, the monitoring camera further includes a control unit 14 which is electrically connected with the camera unit 10, the sensor trigger unit 11, and the image processing unit 12. After the sensor trigger unit 11 detects the trigger signal, and transmits the trigger signal to the control unit 14. Specifically, the control unit 14 controls the camera unit 10 to take an image according to the trigger signal, and then transmits the captured image to the image processing unit 12. After that, the prediction module 1201 extracts features and predicts the image category of the image captured by the camera unit.

In order to reduce error rates of the prediction module 1201, an image pre-processing unit 15 is further disposed on the monitoring camera and electrically connected to the camera unit 10. The image pre-processing unit 15 is arranged for denoising and pre-processing the captured image. After that, the image pre-processing unit 15 transmits the image obtained by denoising and pre-processing to the prediction module 1201 for feature identification, thereby improving recognition accuracy of the prediction module 1201 and reducing the error rate.

Preferably, the monitoring camera further includes a lighting unit 13 electrically connected to the control unit 14, and the lighting unit 13 is arranged for providing a brightness compensation for the camera unit 10 at camera capturing moment. Specifically, the lighting unit 13 includes an LED light source and a light brightness sensor. When the light brightness sensor detects that ambient brightness is insufficient, the control unit 14 controls the LED light source to turn on.

Furthermore, a monitoring camera with an animal recognition function is also provided, which includes a processor, a memory, and a program. Specifically, the program is stored in the memory and executed by the processor, the program includes instructions for performing the above-mentioned camera method.

Furthermore, a readable storage medium includes a computer program cooperating with the monitoring camera, and the computer program is executed by a processor to perform the above-mentioned camera method.

Since the monitoring camera is provided with the feature identification module 120 which includes a training-learning module 1200 and a prediction module 1201 basing on a deep convolutional neural network model. Before use, the trained model of the object to be monitored is obtained through the training-learning module 1200, and the trained model can predict one object or multiple objects and store original date in a database. When the monitoring camera receives the trigger signal from the pyroelectric infrared sensor, the monitoring camera takes an image, and then performs feature extraction and prediction on the captured image through the prediction module 1201. Specifically, the extracting feature data is sent to the trained model for prediction. The prediction result may be in multiple categories, and the category with the highest confidence is found as the image category, thereby determining the image category and then storing the image in the specified folder. If the confidence of two or more categories in the prediction result is greater than 0.85, two or more animals may appear in the captured image at the same time. In this case, the captured images are respectively placed in different folders. Under the folder, it saves the user a lot of time for browsing and analyzing the images, and it is convenient to use.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. A camera method of a monitoring camera with an animal recognition function, comprising steps of:
   image capture: starting a camera system when a trigger signal representing that a moving object enters a camera range is captured by a trigger sensor of a monitoring camera, and capturing an image of an animal within the camera range of the monitoring camera; and
   feature identification: transmitting the captured image to a feature identification system configured on the monitoring camera, and determining an animal category of the animal presented in the captured image by the feature identification system, thereby classifying and storing the captured image;
   said feature identification further comprises steps of:
   training and learning: inputting original image data with a label and a target box of the animal to be monitored into a deep convolutional neural network model to train and learn the original image data, thereby obtaining a trained model capable of detecting the animal to be monitored; and
   feature extraction and prediction: feeding the captured image to the deep convolutional neural network model to extract features, predicting an image category by the trained model, and classifying and storing the captured image according to the image category.

2. A monitoring camera with an animal recognition function, comprising a processor, a memory, and a program, wherein the program is stored in the memory and executed by the processor, the program comprises instructions for performing a camera method of a monitoring camera with an animal recognition function, the camera method comprises steps of:
   image capture: starting a camera system when a trigger signal representing that a moving object enters a camera range is captured by a trigger sensor of a monitoring camera, and capturing an image of an animal within the camera range of the monitoring camera; and
   feature identification: transmitting the captured image to a feature identification system configured on the monitoring camera, and determining an animal category of the animal presented in the captured image by the feature identification system, thereby classifying and storing the captured image;
   said feature identification further comprises steps of:
   training and learning: inputting original image data with a label and a target box of the animal to be monitored into a deep convolutional neural network model to train and learn the original image data, thereby obtaining a trained model capable of detecting the animal to be monitored; and
   feature extraction and prediction: feeding the captured image to the deep convolutional neural network model to extract features, predicting an image category by the trained model, and classifying and storing the captured image according to the image category.

\* \* \* \* \*